Dec. 8, 1931.  C. R. VEGREN ET AL  1,835,125
BALL BEARING MEANS FOR SLIDING MEMBERS
Filed Feb. 3, 1928   2 Sheets-Sheet 1
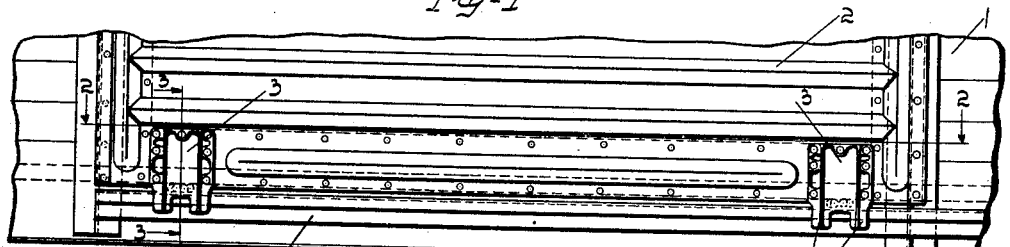
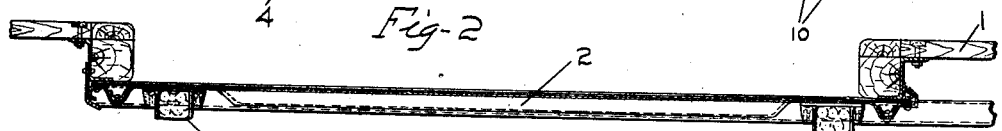
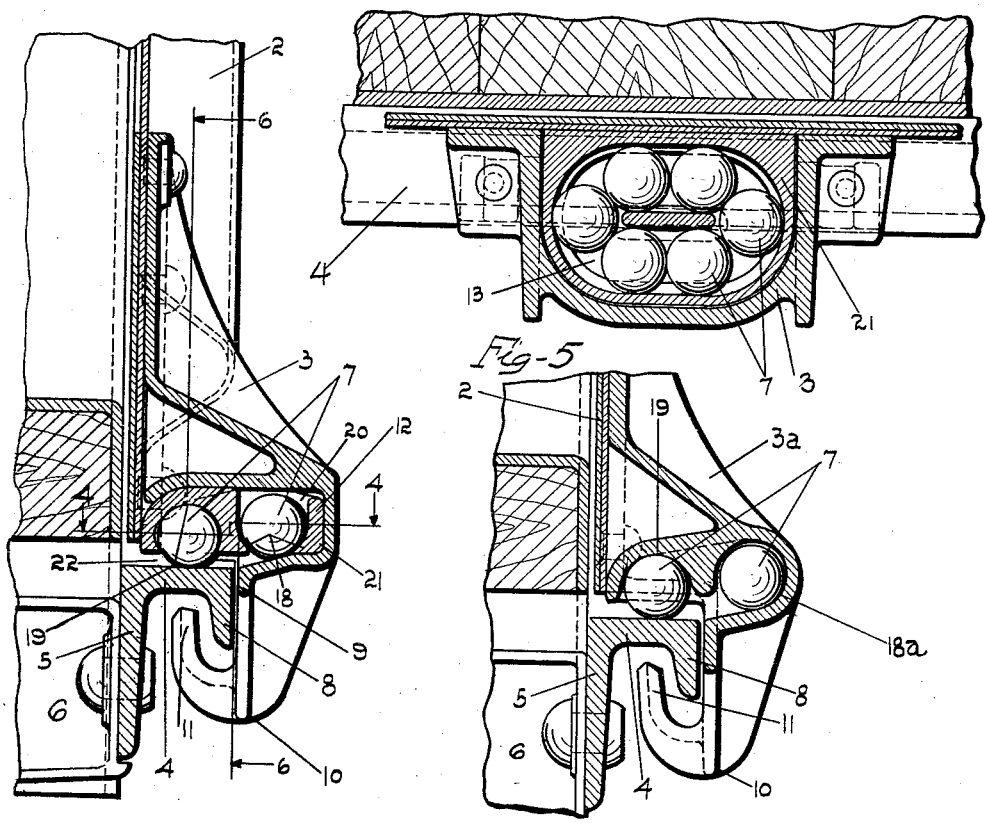
—INVENTORS—
CONRAD R. VEGREN
KENNETH J. TOBIN

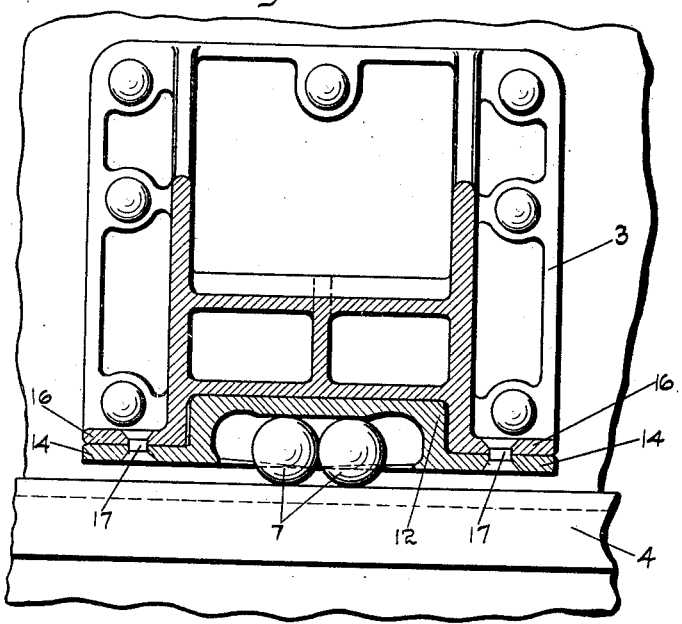
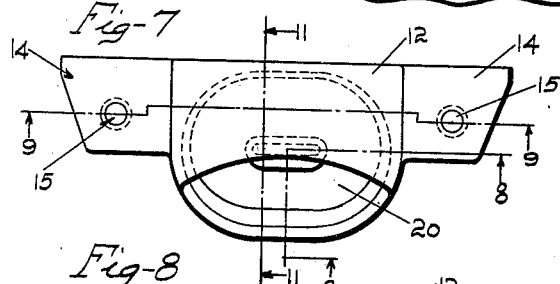
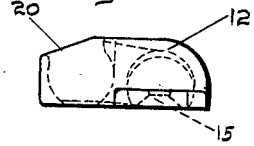
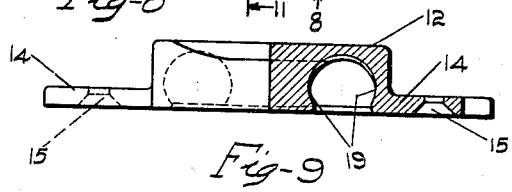
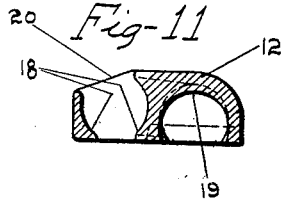
-INVENTORS-
CONRAD R. VEGREN
KENNETH J. TOBIN Patented Dec. 8, 1931

1,835,125

UNITED STATES PATENT OFFICE

CONRAD R. VEGREN AND KENNETH J. TOBIN, OF CHICAGO, ILLINOIS, ASSIGNORS TO CAMEL COMPANY, OF CHICAGO, ILLINOIS, A CORPORATION OF ILLINOIS

BALL BEARING MEANS FOR SLIDING MEMBERS

Application filed February 3, 1928. Serial No. 251,519.

The present invention relates to ball bearing means for sliding members.

The present invention will be described with particular reference to sliding doors of railway house cars, though as the description proceeds it will be apparent that the invention is of much broader application. For the purpose of simplifying the description, however, said description will proceed with reference to house car doors.

An object of the present invention is to provide a retainer for balls which retainer is applicable to sliding members which will provide complete freedom for rolling motion and which will eliminate any possibility of sliding action in the balls.

A further object is to provide a supporting member for a siding door or the like, which supporting member is provided with a plurality of balls, said supporting member being so designed that said balls will successively carry the weight of the door or the like in the sliding movement thereof in a manner to utilize the entire surface of said balls.

A further object is to provide a ball bearing support for a sliding door which will have a natural tendency to cause the door to swing away from the wall with which it cooperates rather than to swing against said wall.

A further object is to provide a door supporting structure of the ball bearing type in which the wearing parts are reduced to a minimum, thereby reducing the necessity for making replacement or repairs.

A further object is to provide a door having ball bearings which door may be shipped as a unit with the rolling elements of said ball bearings self-contained therein.

A further object is to provide a structure involving a sliding door and a track member for said sliding door, said sliding door being provided with ball bearings so arranged that a relatively broad bearing surface of said track member is utilized.

A further object is to provide a support for a sliding door which support is provided with balls for carrying the weight of said door, said support being so arranged that said balls in the sliding movements of said door will roll about a countless number of axes, whereby substantially the entire surface of each of said balls will be utilized for bearing purposes.

Further objects will appear as the description proceeds.

Referring to the drawings—

Figure 1 is a view of part of the side of a railway house car having a sliding door applied thereto, said door being a bottom supported door;

Figure 2 is a sectional view taken along the plane indicated by the arrows 2—2 of Figure 1;

Figure 3 is a sectional view, on an enlarged scale, taken along the plane indicated by the arrows 3—3 of Figure 1;

Figure 4 is a sectional view taken along the plane indicated by the arrows 4—4 of Figure 3;

Figure 5 is a view similar to Figure 3, but illustrating a slight modification;

Figure 6 is a sectional view taken along the plane indicated by the arrows 6—6 of Figure 3;

Figure 7 is a top plan view of a ball retainer forming part of the structure illustrated in Figures 3, 4 and 6;

Figure 8 is a sectional view taken along the planes indicated by the arrows 8—8 of Figure 7;

Figure 9 is a sectional view taken along the planes indicated by the arrows 9—9 of Figure 7;

Figure 10 is a view in end elevation of the retainer shown in Figure 7; and

Figure 11 is a sectional view taken along the plane indicated by the arrows 11—11 of Figure 7.

The numeral 1 indicates the side of a railway house car and the numeral 2 indicates a sliding door. The particular door chosen for illustration is a bottom supported door, brackets 3—3 being secured adjacent to the bottom of said door 2 near the front and rear edges of said door, which brackets have cooperatively associated therewith ball bearings for engagement with a track member 4, which extends longitudinally along the car side.

Two embodiments of the bracket 3 are illustrated in the drawings, Figure 3 being a sectional view of one of said embodiments and Figure 5 being a sectional view of the other of said embodiments. The embodiment of said bracket shown in Figure 3 is given the numeral 3, whereas the embodiment illustrated in Figure 5 is indicated by the numeral 3a. The differences between the brackets 3 and 3a do not involve any differences in the structure of the car or the sliding door.

The weight of the door 2 is carried by the track member 4, which is shown in the form of a channel having one flange indicated by the numeral 5, secured to the car body by means of brackets 6 shown in part in Figures 3 and 5. The web 6 of said channel provides upon its upper side a flat surface for contact with a plurality of balls of steel or other hard material, which balls are indicated by the numerals 7—7. The outer flange of the track member 4, which outer flange is indicated by the numeral 8, is adapted to be engaged by the downwardly extending portion 9, which, as indicated in Figure 1, may be bifurcated, the two bifurcations being indicated by the numerals 10—10. Each bifurcation 10 is provided with the upwardly extending tongue portion 11 underlying the flange 8. By reason of the engagement between the tongue portions 11—11 and the flange 8, outward swinging movement of the bottom of the door 2 is limited.

Each of the brackets 3 is recessed intermediate of its height for the reception of a ball retainer 12. The outlines of the ball retainer chosen for illustration are clearly illustrated in Figures 3, 4, 6, 7, 8 and 9, from which figures it will appear that said retainer provides a raceway 13, which is substantially elliptical in contour. The particular retainer chosen for illustration provides space for six balls. The retainer 12 is provided with ear portions 14—14 having rivet holes 15—15. Said ear portions 14—14 are adapted to be disposed against corresponding flat portions 16—16 of the brackets 3 and are secured in place by means of rivets 17—17. The raceway 13, when the door 2 is in place upon the car, has its major axis parallel with the plane of movement of the door 2 and substantially in the same vertical plane as the outer edge of the track member 4. It will be clear, of course, that as the door 2 is moved with a sliding movement along the track member 4, the balls 7 will be rolled with a movement of translation with reference to the corresponding retainer 12, traveling around the raceway 13. Therefore, the identity of the balls bearing the weight of the door is continually changed as the door is moved. Each retainer 12 is so designed that the balls 7—7 tend to gravitate inwardly, that is—toward that portion of the raceway 13 which is disposed above the track member 4. This feature is illustrated in Figures 3 and 5, from which it will be noted that the curved seats 18 and 18a, which define the lower limits of the ball 7 in the outer portion of the raceway in said Figures 3 and 5 respectively, are disposed at a higher level than the balls 7—7 in the inner part of the raceway 13, which latter balls bear against the downwardly facing curved seats 19—19. Expressed in other language, the parts are so designed that when the retainers 12—12 are in position within the brackets 3—3 and the door 2 is in position on the car, the centers of the balls in the outer part of the raceway 13 are at a higher level than the centers of the balls in the inner part of the raceway 13. From an inspection of Figures 3, 7 and 10, it will be noted that the retainer 12 has an upwardly opening mouth 20, through which balls may be inserted into said retainer before said retainer is inserted into its corresponding bracket 3. From an inspection of Figure 3 it will be noted that the recess in the bracket 3 for receiving the retainer 12, which recess is indicated by the numeral 21, is provided with the mouth 22, which is open when the door 2 is free of the car, as for example before the door has been installed upon the car. Inasmuch as the mouth 20 of the retainer 12 opens upwardly, it is a simple matter to mount the retainer 12 with the balls loaded therein within the recess 21 of the corresponding bracket 3, after which the ears 14—14 may be riveted to the portions 16—16 of said bracket 3. After the retainer has been secured in place, the door, together with its roller bearings, may be shipped as a unit and may be mounted upon a car with the exercise of a minimum of skill.

The structure shown in Figure 5 involves fewer parts than the structure shown in Figure 3, inasmuch as no retainer 12 is contemplated in the structure shown in Figure 5. It will be clear that the balls shown in the structure illustrated in Figure 5 will cooperate with the track member 4 in precisely the same manner as that discussed in connection with the structure illustrated in Figure 3. In shipping the structure illustrated in Figure 5, it will ordinarily be considered good practice to send the balls 7—7 separate from the bracket 3a. In mounting upon a car a door 2 provided with brackets 3a such as illustrated in Figure 5, the ordinary worker will have no difficulty in fitting the balls into their raceway in the bracket 3a.

From the above description it will be noted that the balls roll on and off the track, one ball pushing the next one off. Due to the fact that the raceway is inclined from the outer side of the car inwardly, there will be a continual tendency for the balls to gravitate toward that side of the raceway above the track member 4, eliminating any sliding action of the balls. In other words, as the door is pushed either toward its open position or its closed position, the balls travel in their raceway in an elliptical path without any tendency for the balls to slide. The balls revolve in all directions, and therefore utilize their entire surface, whereby they may be used indefinitely without any appreciable wear. A further practical advantage is that the track member is engaged through a broad bearing surface, which bearing surface extends from the outer edge of the track member 4 inwardly to the innermost line of contact with the balls 7—7. By reason of this broad bearing surface on the track member, the tendency of the track member to groove is very materially reduced, thereby further reducing the hard usage upon the balls.

By reference to Figures 3 and 5, it will be noted that the balls 7 in the inner part of the raceway are under compression leaving no clearance between said balls and the surface above them. The other balls are free. As the door is moved longitudinally of the car and the balls under compression roll successively off the track member, they have a tendency to urge the door laterally away from the car side. This tendency is not counterbalanced by the free rolling balls which are presented successively to the edge of the track member. Consequently there is a net tendency to direct the door to a plane in which said door is free of the car side.

Though certain preferred embodiments of the present invention have been described in detail, many modifications will occur to those skilled in the art. It is intended to cover all such modifications that fall within the scope of the appended claims.

What is claimed is—

1. In combination, a track member, a sliding member, and means carried by said sliding member comprising a ball race, said ball race having a plurality of balls therein, a portion of said ball race being disposed above said track member and another portion of said ball race being disposed outwardly of said track member, the raceway of said ball race being inclined relative to said track member.

2. In combination, a track member, a sliding member carried thereby, said sliding member being provided with a ball race, a plurality of balls in said race, said race having a portion for guiding said balls in position to ride upon said track member and another portion for guiding said balls out of cooperative relationship with said track member, said portions providing a continuous raceway, the raceway of said ball race being inclined relative to said track member in a direction to cause said balls to tend to gravitate toward said track member.

3. In combination, a track member, a sliding member carried thereby, said sliding member being provided with a ball race having a continuous raceway, balls in said raceway, part of said raceway being disposed in position to carry said balls in a position wherein the weight of said sliding member is carried by the balls in said part of said raceway, another part of said raceway being disposed in position to guide said balls out of cooperative relationship with said track member, laterally of said track member, said ball race being tilted relative to said track member.

4. In combination, in a railway house car, a track member, a sliding door, brackets carried by said door, said brackets being provided with portions cooperating with said track member to limit swinging movement of said door relative to said track member, said brackets being provided with raceways, a plurality of balls in each of said raceways, said raceways being in position to hold progressively changing balls within said raceway out of contact with said track member and to cause said balls to gravitate toward said track member.

5. In combination, a track member of a railway house car, a sliding door cooperating therewith, brackets carried by said door, said brackets having portions cooperating with said track member to limit swinging movement of said door relative to said track member, at least one of said brackets being provided with a raceway, said raceway having the contour of a closed, curved geometrical figure, a portion only of said geometrical figure overlying said track member.

6. In combination, a track member of a railway house car, a sliding door cooperating therewith, brackets carried by said door, said brackets having portions cooperating with said track member to limit swinging movement of said door relative to said track member, at least one of said brackets being provided with a raceway, said raceway having the contour of a closed, curved geometrical figure, the contour of said geometrical figure being symmetrical, an axis of symmetry being disposed parallel with the edge of said track member, the portion of said raceway inwardly of said axis of symmetry being disposed above said track member, the other half of said raceway being disposed outwardly of said track member.

7. In combination, a track member of a railway house car, a sliding door cooperating therewith, brackets carried by said door, said brackets having portions cooperating with said track member to limit swinging movement of said door relative to said track member, at least one of said brackets being provided with a raceway, said raceway having the contour of a closed, curved geometrical figure, the contour of said geometrical figure being symmetrical, an axis of symmetry being disposed parallel with the edge of said track member, the portion of said raceway inwardly of said axis of symmetry being disposed above said track member, the other half of said raceway being disposed outwardly of said track member, said two halves of said raceway on the two sides of said axis of symmetry being disposed at different levels.

8. In combination, a track member of a railway house car, a sliding door cooperating therewith, brackets carried by said door, said brackets having portions cooperating with said track member to limit swinging movement of said door relative to said track member, at least one of said brackets being provided with a raceway, said raceway having the contour of a closed, curved geometrical figure, the contour of said geometrical figure being symmetrical, an axis of symmetry being disposed parallel with the edge of said track member, the portion of said raceway inwardly of said axis of symmetry being disposed above said track member, the other half of said raceway being disposed outwardly of said track member, said two halves of said raceway on the two sides of said axis of symmetry being disposed at different levels, the outer half being at a higher level than the inner half.

9. In combination, a track member of a railway house car, a sliding door cooperating with said track member, brackets carried by said door, said brackets providing a recess opening downwardly and rearwardly of said bracket, a ball retainer adapted to be positioned in said recess and adapted to be secured to said bracket, and a plurality of balls in said retainer adapted to cooperate successively with said track member.

10. In combination, a track member of a railway house car, a sliding door cooperating with said track member, brackets carried by said door, said brackets providing a recess opening downwardly and rearwardly of said bracket, a ball retainer adapted to be positioned in said recess and adapted to be secured to said bracket, and a plurality of balls in said retainer adapted to cooperate successively with said track member, said balls being disposed in a raceway in said retainer, which raceway has the contour of a closed, curved geometrical figure, part of which figure is disposed above said track member and part of which figure is disposed outwardly of said track member, said raceway having the outer part of its contour disposed at a higher level than the inner part thereof.

11. In combination, in a house car, a track member having an outer edge, a sliding door carried by said track member, said sliding door being provided with a ball retaining member having an elliptical raceway, the major axis of said raceway being in substantially the same vertical plane as said outer edge, the plane of said raceway being tilted relative to the bearing surface of said track member in a direction to cause the balls within said ball race to gravitate toward said track member.

Signed at Chicago, Illinois, this 31st day of January, 1928.

CONRAD R. VEGREN.
KENNETH J. TOBIN.